Jan. 13, 1931.     C. H. MORROW     1,788,537
GAS VALVE STRUCTURE
Filed Dec. 29, 1926
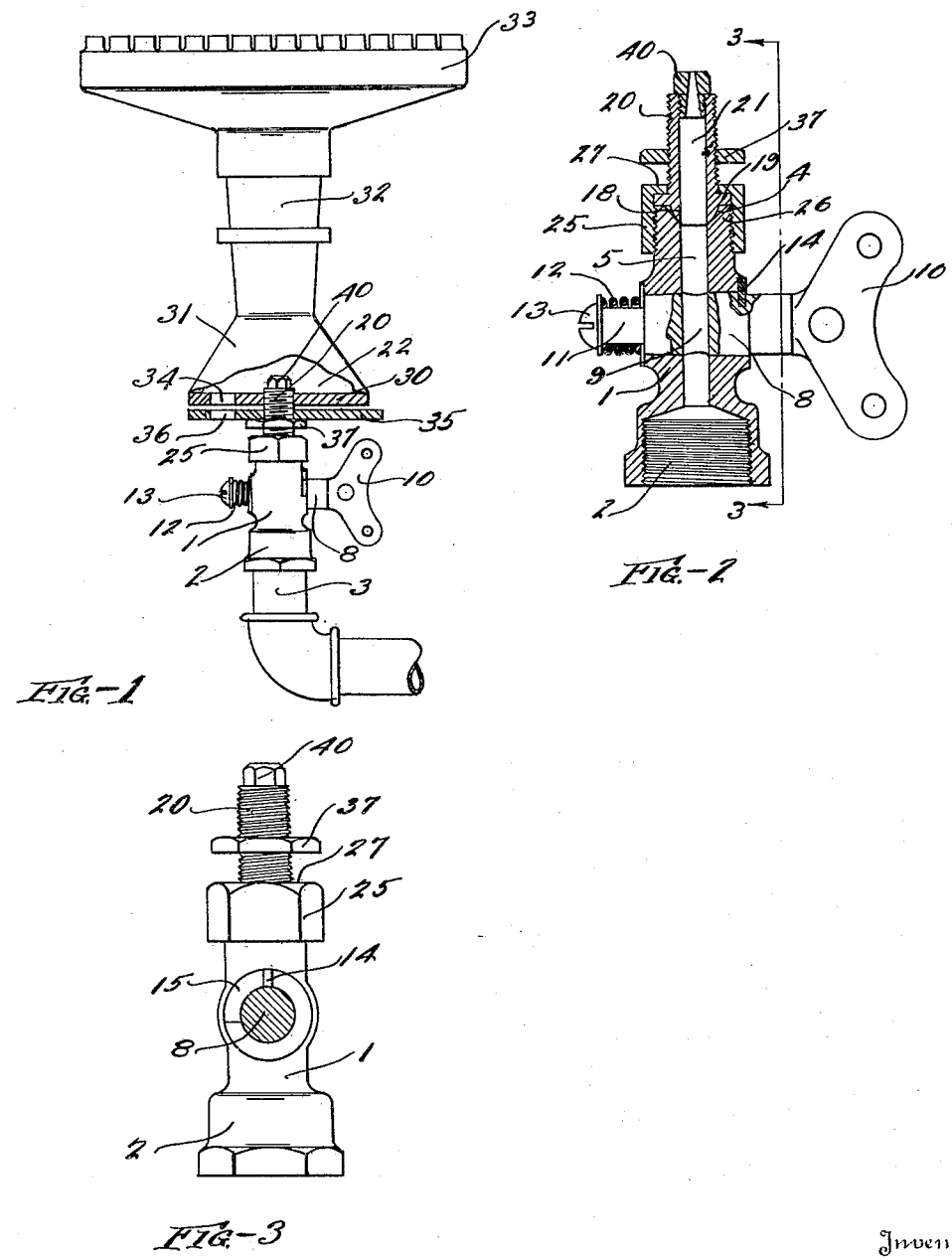

Patented Jan. 13, 1931

1,788,537

UNITED STATES PATENT OFFICE

CLARENCE H. MORROW, OF CLEVELAND, OHIO, ASSIGNOR TO THE HOTSTREAM HEATER COMPANY, OF CLEVELAND, OHIO, A CORPORATION OF OHIO

GAS-VALVE STRUCTURE

Application filed December 29, 1926. Serial No. 157,766.

This invention relates to improvements in valve structures or gas cocks for gas burners such as are used with domestic hot water heaters and like devices.

The object of the present invention is the provision of an improved valve structure or gas cock which includes a body or casing adapted for connection to the gas supply conduit and provided with a valve for controlling the flow of gas to the burner, said structure also including a removable jet nozzle member adapted for threaded connection to the burner and for connection to the valve body by a union coupling nut. Said valve body may therefore be readily disconnected from the burner by uncoupling the union but without disconnecting said body from the gas supply conduit, the above mentioned controlling valve of said body being closed during such disconnection. There is, therefore, no necessity for providing the gas supply conduit with an additional cut-off valve and a coupling device, as is now the practice.

Further objects of the invention are in part obvious and in part will appear more in detail hereinafter.

In the drawings, which represent one suitable embodiment of the invention, Fig. 1 is a side elevation of the present improved valve structure connected to a gas supply conduit and to a suitable gas burner; Fig. 2 is a vertical sectional view through the structure; and Fig. 3 is a view on the line 3—3, Fig. 2.

Referring to the drawings, 1 represents the casing or body of the present valve structure or gas cock, said body being provided at one end with a depending, internally threaded tubular portion 2 for connection of the gas inlet or supply conduit 3. At its other end, said body is provided with a conical or tapering seat 4 and extending from substantially the center of said seat to the space within the tubular portion 2 is a gas passage 5.

The flow of gas through said passage is controlled by a plug valve 8 rotatably mounted in a cylindrical, transverse opening in the valve body intermediate the ends thereof, said valve being provided with a transverse passage 9 for co-operation with passage 5. Said valve is provided at one end thereof with an operating handle 10 and at its other end with a reduced portion 11 surrounded by a spring 12. The inner end of this spring engages the valve body 1 and the main body portion of the valve 8 while the outer end of the spring engages the headed end 13 of a screw secured in the outer end of the reduced portion 11. This spring maintains the valve in the position to which it has been turned, and preferably said valve is provided with a pin 14 movable in a slot 15 in the valve body 1 so as to limit rotary movement of the valve.

Cooperating with the conical seat 4 of body 1 is the semi-spherical head 18 of a removable jet nozzle member, said member being also provided with an outwardly extending, annular flange portion 19 and an upwardly extending, externally threaded stem portion 20. A gas passage 21, extending through said head and stem portions, communicates with the gas passage 5 of the valve body and supplies gas to the air and gas mixing chamber 22 of a gas burner. The semi-spherical head of said jet nozzle member is confined to its seat by a union or coupling nut 25 threaded upon the upper tubular end portion 26 of the valve body 1 and provided with an inwardly extending, annular flange 27 engaging over the annular flange portion 19 of said jet nozzle member.

The upper end of the threaded stem portion 20 of said removable jet nozzle member extends through and in some cases may be threaded into a centrally disposed opening in the circular bottom wall 30 of the gas and air mixing casing or conduit of the gas burner. Said casing comprises a frusto-conical portion 31 terminating in an upwardly extending tubular portion 32, upon the upper end of which is suitably mounted the burner head 33, preferably by a bayonet joint connection so that said head may be readily applied and removed when desired. The bottom wall 30 of said mixing casing is provided with one or more air inlet openings 34, the flow of air therethrough being controlled by a disk valve 35 threaded upon the stem portion 20 of the removable jet nozzle member, said valve 35 being provided with one or more cooperating air openings 36 and being maintained in proper position upon said stem portion by a lock nut 37.

If desired, the upper end of stem portion 20 may be internally threaded to receive a suitable nipple 40 provided with a rather small orifice for natural gas, a similar nipple with a large orifice being provided for artificial gas.

Gas burners of the type shown and described are commonly used in domestic hot water heaters or other like devices where either or both of the burner 33 and mixer tube 32 is rigidly anchored or supported in a stationary frame or casing which in turn is anchored or supported upon the coils of the water circulating system. In many cases also the burner and mixer are so anchored to the casing as to be non-rotatable. Furthermore, the arrangement of supply piping for the gas supply frequently involves angles or joints quite close to the burner and mixer, so that the distance along the first stretch of pipe beyond the elbow shown in the drawings is so short that the piping has no appreciable spring and is practically rigid and immovable. Under such circumstances, it is obvious that the mixer 32 and valve 1 are both firmly anchored so that they are immovable relatively to each other and as a consequence the mixer 32 cannot be lifted off from the nozzle member 20 in cases where they are merely sleeved together without being threaded, and cannot be unscrewed therefrom when the connection is a threaded one. When it is desired to remove the burner or the nozzle member for cleaning one or the other, or for gaining access to the nozzle member 20 for cleaning the same, it is therefore necessary to go way back along the piping beyond the elbow shown in the drawings to the first union and there uncouple the piping and disconnect the parts from the supply line toward the burner. Such an arrangement obviously involves a shut-off valve in addition to the valve shown in the drawings, as well as the necessity for considerable plumbing work in unscrewing the pipes and fittings.

In the present arrangement, the valve or cock shown includes not only a controlling or shut-off valve member but also union parts located between such valve member and the burner, and when it is desired to remove either the burner or mixer or both for cleaning them or to gain access to the nozzle member 20, the valve 8 may be turned to cut off position and the burner and mixer removed by a simple uncoupling of the union parts, not only simplifying the job and reducing the labor, but also saving the cost of an extra coupling and valve.

What I claim is:

In a construction of the character described, the combination with a burner and mixer member adapted for mounting in a water heater or like device, of a union cock therefor, comprising a valve body threaded at one end for connection to a gas supply pipe and provided with a shut off valve member, a nozzle member adapted to enter an opening in the burner mixer, and a union connection between said nozzle member and valve body.

In testimony whereof I hereby affix my signature.

CLARENCE H. MORROW.